(12) United States Patent
Inaba et al.

(10) Patent No.: US 11,624,752 B2
(45) Date of Patent: Apr. 11, 2023

(54) AUTOMATIC ANALYZER

(71) Applicant: Hitachi High-Technologies Corporation, Tokyo (JP)

(72) Inventors: Tooru Inaba, Tokyo (JP); Takamichi Mori, Tokyo (JP); Tetsuji Kawahara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 684 days.

(21) Appl. No.: 16/488,647

(22) PCT Filed: Feb. 26, 2018

(86) PCT No.: PCT/JP2018/006869
§ 371 (c)(1),
(2) Date: Aug. 26, 2019

(87) PCT Pub. No.: WO2018/173636
PCT Pub. Date: Sep. 27, 2018

(65) Prior Publication Data
US 2020/0386779 A1    Dec. 10, 2020

(30) Foreign Application Priority Data
Mar. 24, 2017 (JP) .............................. JP2017-058389

(51) Int. Cl.
*G01N 35/10* (2006.01)
*G01N 35/00* (2006.01)

(52) U.S. Cl.
CPC ... *G01N 35/1011* (2013.01); *G01N 35/00613* (2013.01); *G01N 35/1002* (2013.01); *G01N 2035/0097* (2013.01)

(58) Field of Classification Search
CPC ......... G01N 35/1011; G01N 35/00613; G01N 35/1002; G01N 2035/0097; G01N 35/1004; G01N 35/1016
See application file for complete search history.

(56) References Cited

U.S. PATENT DOCUMENTS 4,358,928 A * 11/1982 Kotwicki .............. F04B 49/025
60/397
5,039,280 A   8/1991 Saulgeot et al.
(Continued)

FOREIGN PATENT DOCUMENTS

JP    59-168336 A    9/1984
JP    59168336 A *  9/1984
(Continued)

OTHER PUBLICATIONS

Extended European Search Report issued in European Application No. 18771804.0 dated Dec. 8, 2020 (eight (8) pages).
(Continued)

*Primary Examiner* — Jill A Warden
*Assistant Examiner* — John McGuirk
(74) *Attorney, Agent, or Firm* — Crowell & Moring LLP

(57) ABSTRACT

When the automatic analyzer is installed in an environment with a high altitude and different external atmospheric pressures, there is a problem that an amount of vacuum suction decreases due to a decrease in suction performance of a vacuum pump and it is difficult to perform vacuum suction of an analyzed reaction liquid. In view of the above, by newly providing a pressure adjustment mechanism within a flow path connecting a vacuum tank to vacuum pump, it possible to control the pressure difference between a pressure in the vacuum tank and an external atmospheric pressure where the analyzer is installed to be constant regardless of the installation environment. Additionally, by providing a hole in communication with the outside in the vacuum tank
(Continued)

or a vacuum bin, it possible to control the pressure difference between the pressure in the vacuum tank and the external atmospheric pressure where the analyzer is installed to be constant regardless of the installation environment.

6 Claims, 11 Drawing Sheets

(56) References Cited

U.S. PATENT DOCUMENTS

| | | | |
|---|---|---|---|
| 5,746,581 | A | 5/1998 | Okumura et al. |
| 6,158,416 | A * | 12/2000 | Chen ................ F02D 41/401 123/380 |
| 2007/0140916 | A1 | 6/2007 | Spiss |
| 2008/0101962 | A1 * | 5/2008 | Cromm ................ F04B 7/04 417/326 |
| 2009/0041628 | A1 | 2/2009 | Kakizaki |
| 2012/0118048 | A1 | 5/2012 | Wetzig |
| 2015/0346231 | A1 | 12/2015 | Mori et al. |

FOREIGN PATENT DOCUMENTS

| | | | |
|---|---|---|---|
| JP | 62-178787 A | | 8/1987 |
| JP | S62178787 A | * | 8/1987 |
| JP | 63-12965 A | | 1/1988 |
| JP | 3-500440 A | | 1/1991 |
| JP | 3-25873 U | | 3/1991 |
| JP | 4-99961 A | | 3/1992 |
| JP | 4-303773 A | | 10/1992 |
| JP | 8-50086 A | | 2/1996 |
| JP | 8-74768 A | | 3/1996 |
| JP | 9-72919 A | | 3/1997 |
| JP | H0972919 A | * | 3/1997 |
| JP | 2005-308506 A | | 11/2005 |
| JP | 2012-518780 A | | 8/2012 |
| WO | WO 2014/112591 A1 | | 7/2014 |

OTHER PUBLICATIONS

International Search Report (PCT/ISA/210) issued in PCT Application No. PCT/JP2018/006869 dated Apr. 24, 2018 with English translation (four (4) pages).

Japanese-language Written Opinion (PCT/ISA/237) issued in PCT Application No. PCT/JP2018/006869 dated Apr. 24, 2018 (seven (7) pages).

* cited by examiner

[FIG. 1]
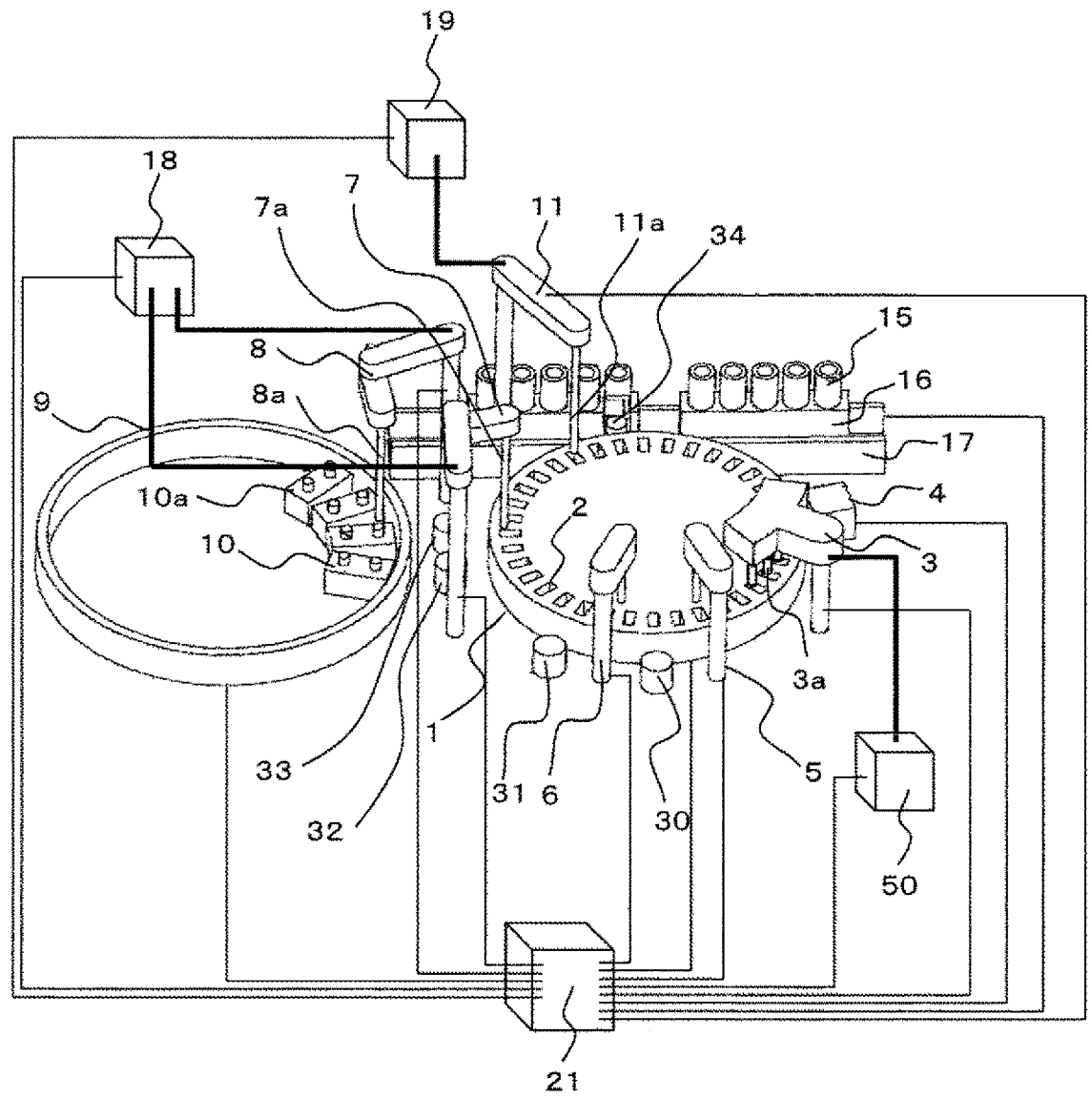

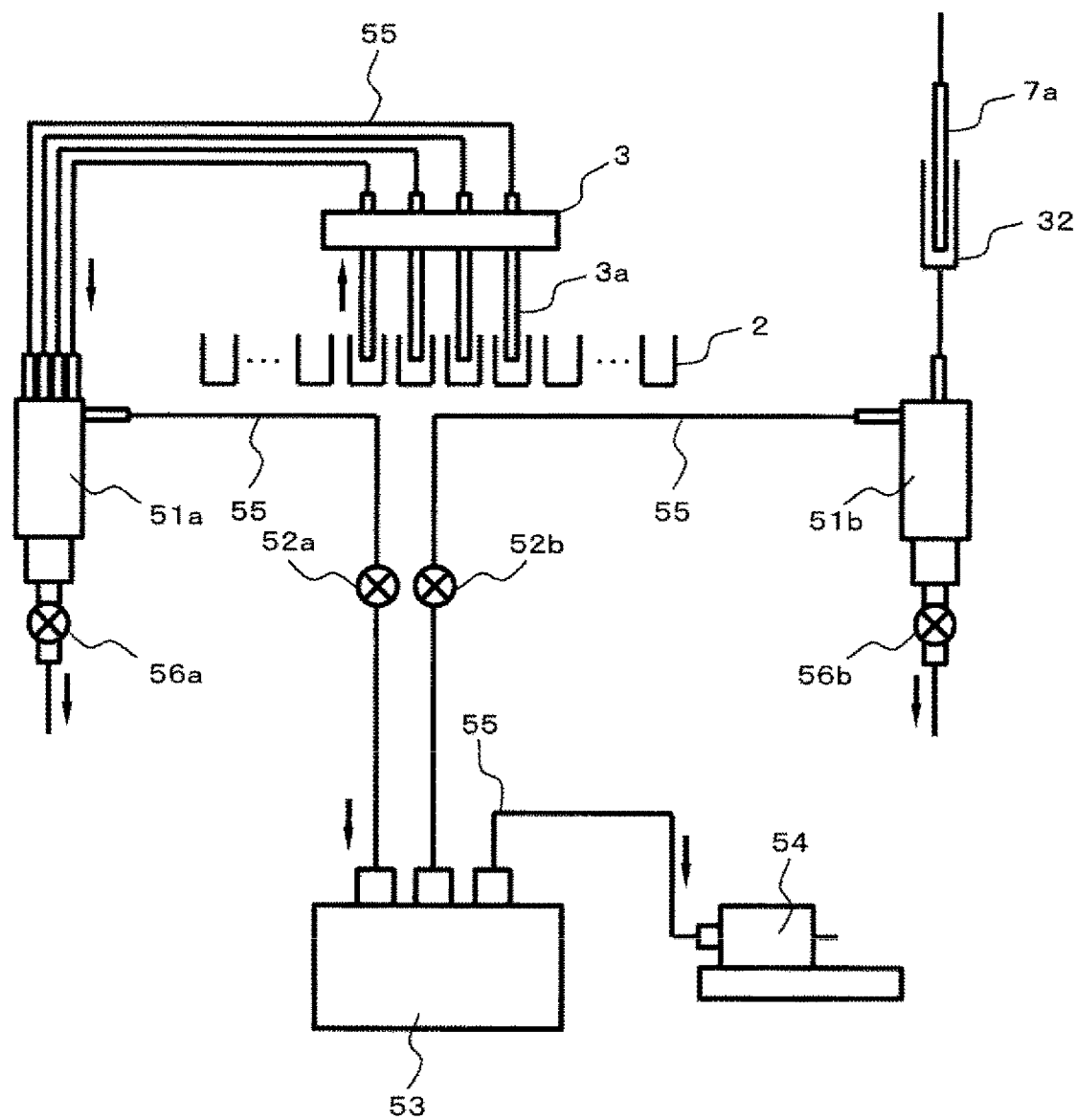
[FIG. 2]

[FIG. 3]
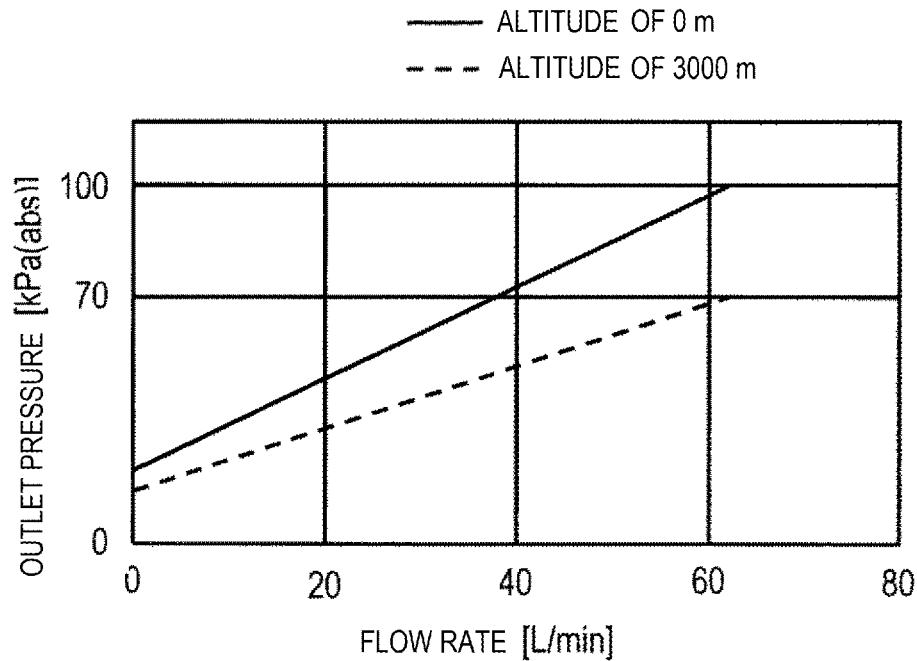
[FIG. 4]
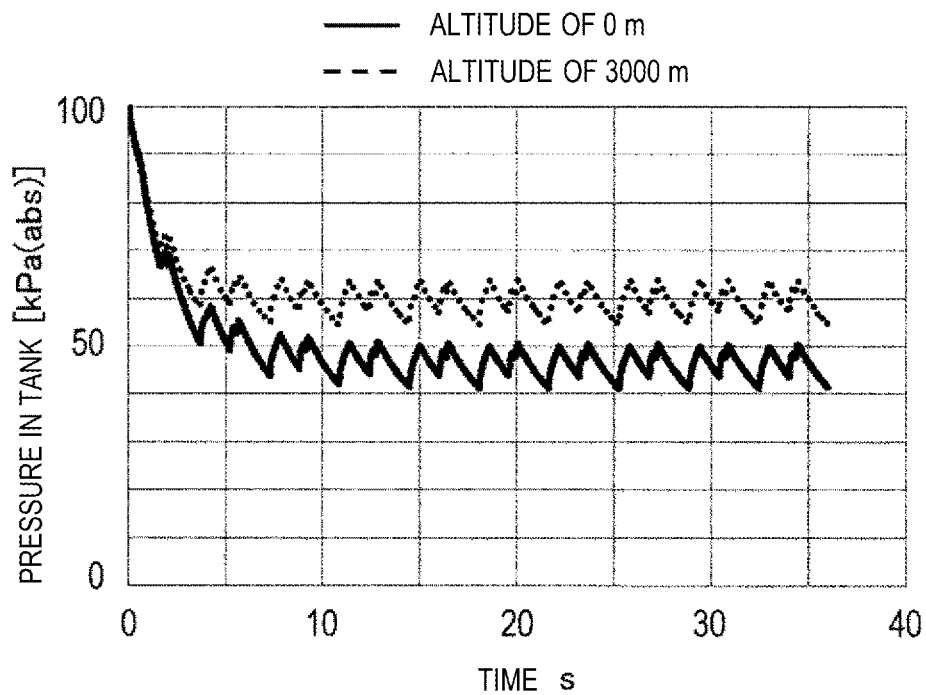

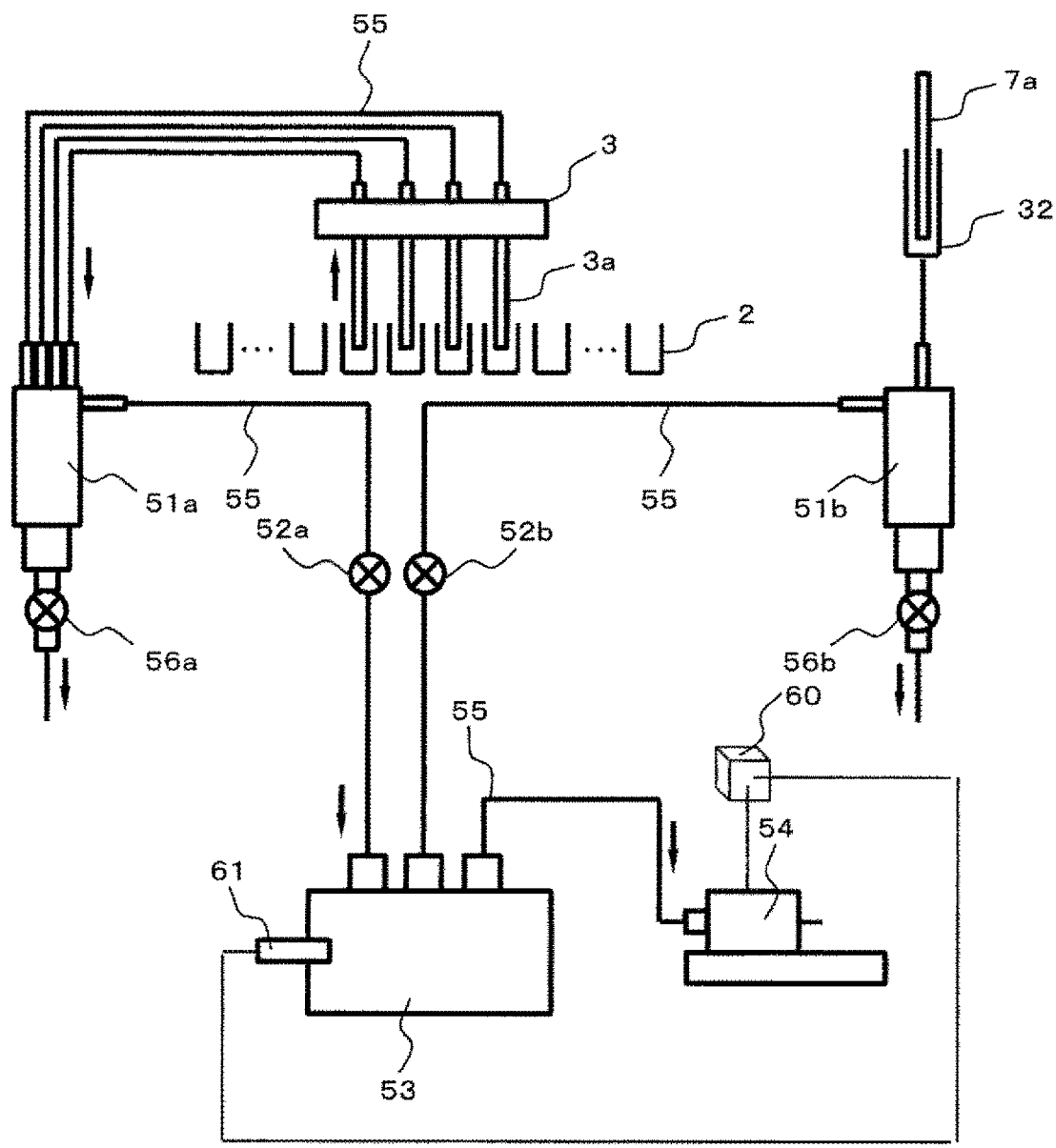
[FIG. 5]

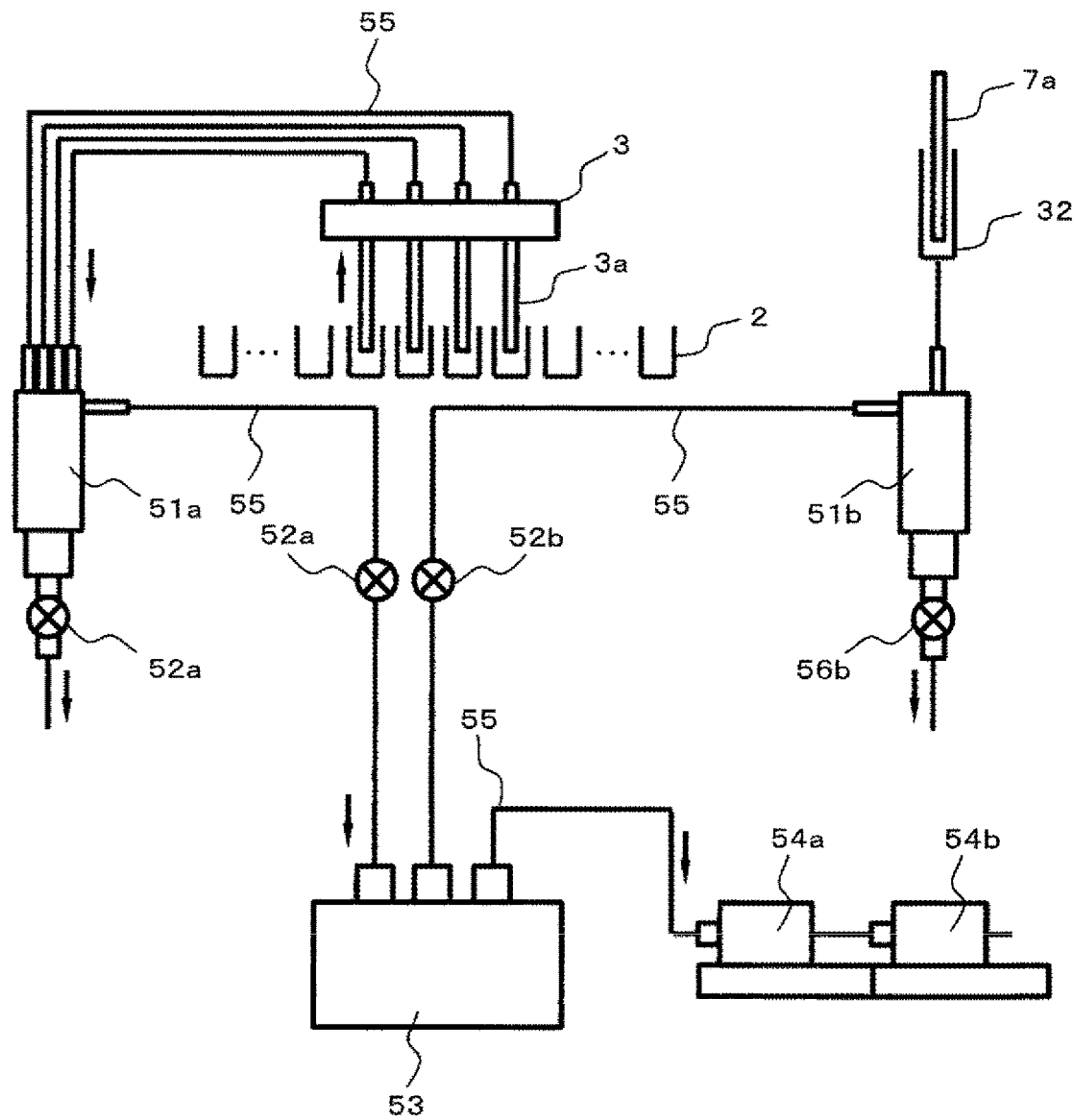
[FIG. 6]

[FIG. 7]
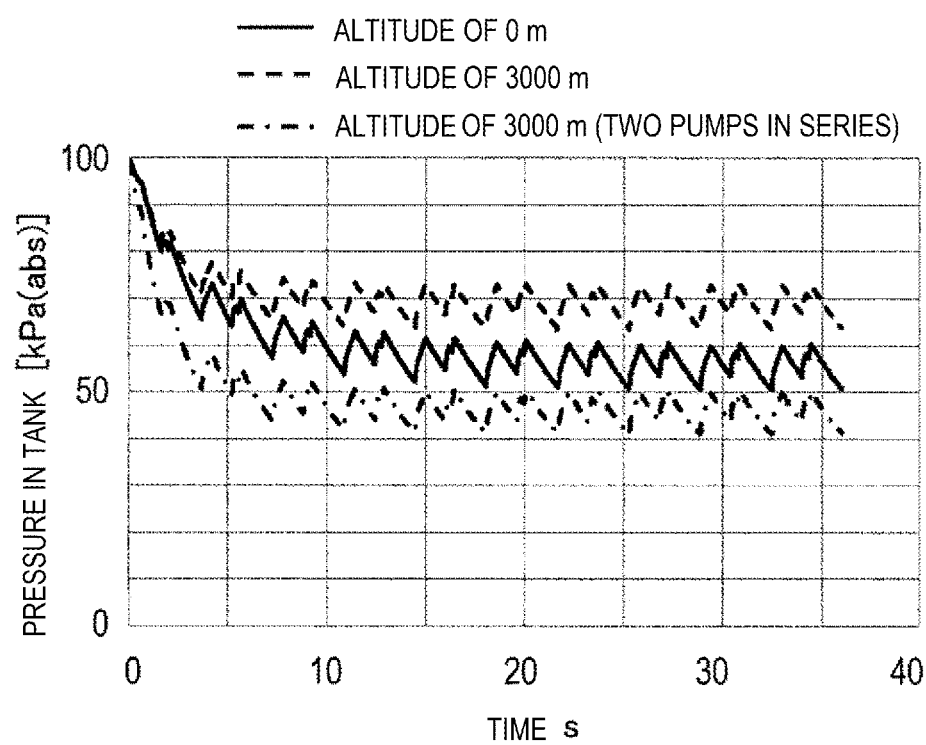

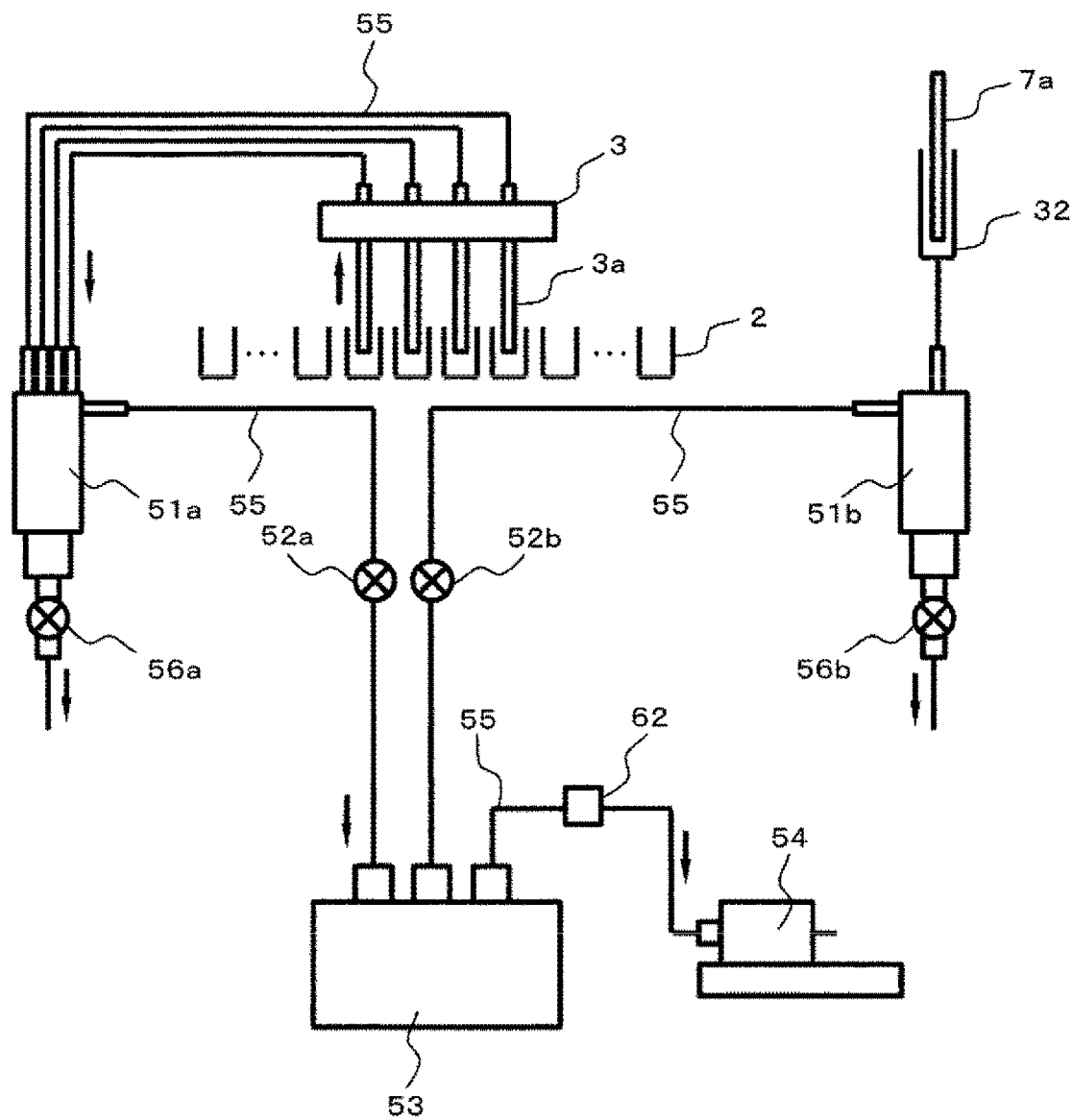
[FIG. 8]

[FIG. 10]
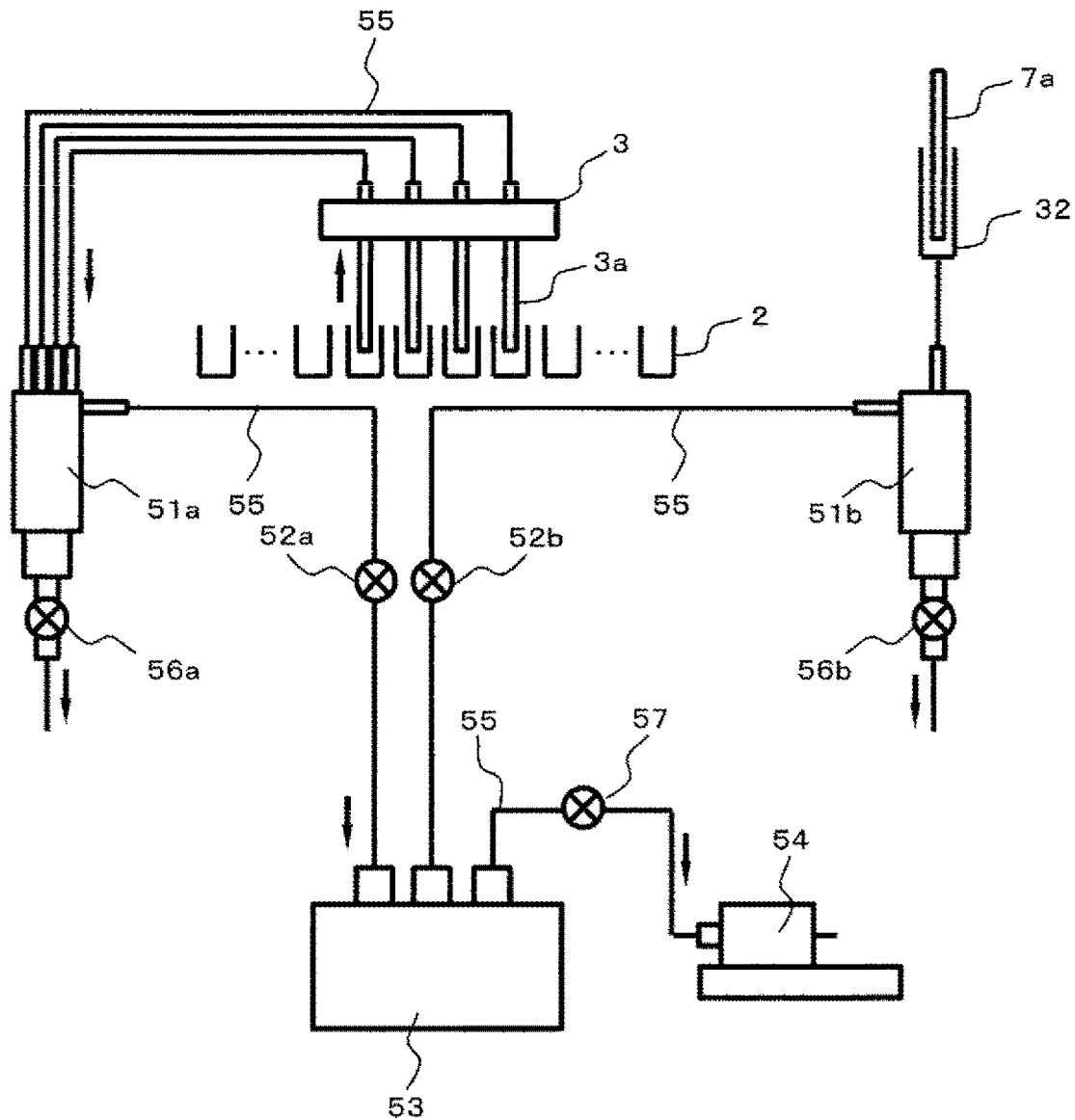
[FIG. 11]
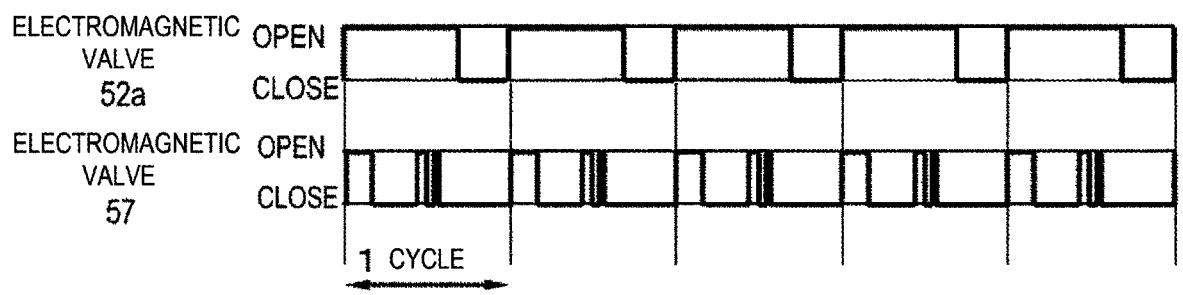

[FIG. 12]
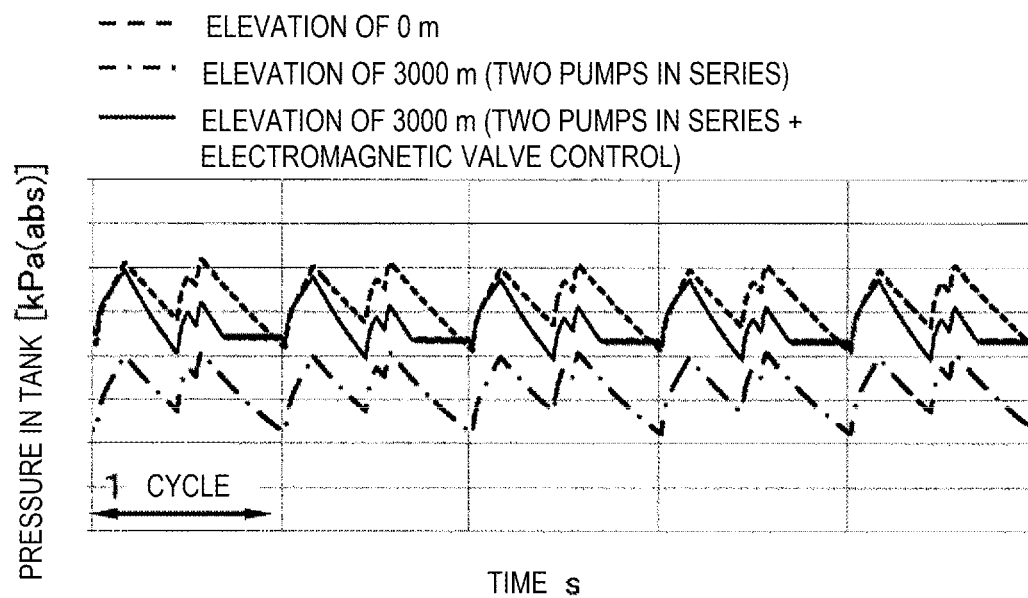

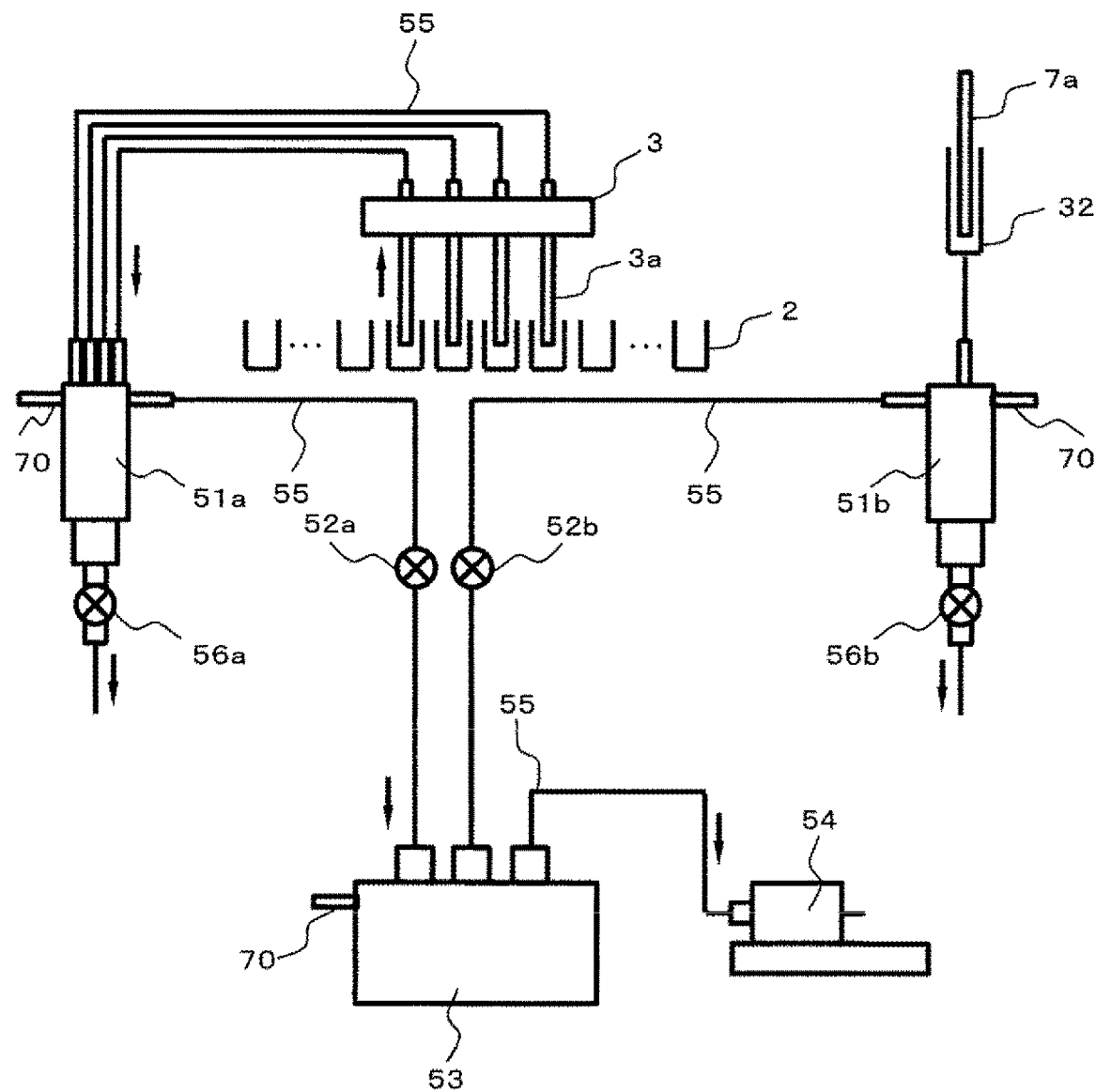
[FIG. 13]

AUTOMATIC ANALYZER

TECHNICAL FIELD

The present invention relates to an automatic analyzer including a vacuum suction device for vacuum suction of reaction liquid after analysis from a reaction container.

BACKGROUND ART

Patent Literature 1 discloses a blood suction device by vacuum suction. Patent Literature 1 discloses that a blood infiltration preventing container includes a main body and a lid body, and is placed on a container placing portion protruding upward from an upper surface portion of a case. Two openings are formed in the lid body, and a lower end of a connecting pipe of a pressure adjustment member is inserted into the main body through one opening and a lower end of a connecting pipe is inserted into the main body through another opening. It is disclosed that the pressure adjustment member is provided with a pressure adjustment valve at an appropriate position in the connecting pipe and suction pressure can be adjusted by changing a flow rate of air suctioned from a connecting tube by rotating the pressure adjustment valve.

Patent Literature 2 discloses a vacuum suction device for vacuum suction of a reaction liquid or vacuum suction of a washing liquid or the like adhering to a probe. Patent Literature 2 discloses "An automatic analyzer including a vacuum pump, a first vacuum tank connected to the vacuum pump, a reaction liquid suction unit connected to the first vacuum tank, a vacuum drying unit for vacuum drying a tip of a dispensing probe, and a second vacuum tank connected between the vacuum drying unit and the first vacuum tank."

PRIOR ART LITERATURE

Patent Literature

PTL 1: JP-A-H08-50086
PTL 2: JP-A-2005-308506

SUMMARY OF INVENTION

Technical Problem

The automatic analyzer may be installed in an area with greatly different environments so that the analyzer needs to be able to operate stably in various environments. That is, the analyzer should be stable even in a high-temperature and high-humidity environment such as a tropical area or a low-pressure environment at a highland. In particular, in recent years, due to the influence of globalization, if an automatic analyzer is installed in a high-altitude environment, there is a problem that stability decreases due to environmental change accompanying a change in external atmospheric pressure. In particular, it may be difficult to perform vacuum suction of an analyzed reaction liquid from a reaction container due to a decrease in suction performance of a vacuum pump.

Patent Literature 1 discloses the blood suction device by vacuum suction, in which blood suction can be performed at a suction speed corresponding to a difference in viscosity by installing the pressure adjustment member on an upstream side of the blood infiltration preventing container. However, the purpose of the blood infiltration preventing container disclosed in Patent Literature 1 is only for storing blood, and does not have a tank capacity enough to maintain sufficient vacuum pressure. Further, in the blood suction device disclosed in Patent Literature 1, the pressure adjustment member is installed on the upstream side of the blood infiltration preventing container, but in an automatic analyzer of the invention, since it is necessary to install a plurality of suction flow paths from one vacuum tank, it is difficult to install pressure adjustment members in a plurality of flow paths in terms of cost and complexity in assembly. In addition, this pressure adjustment member is used for performing adjustment according to the difference in the viscosity of blood at the time of blood suction, and the role thereof is basically different from the invention which is intended for a case where external environment such as atmospheric pressure is greatly different.

Patent Literature 2 discloses the vacuum suction device for vacuum suction of the reaction liquid or vacuum suction of the washing liquid or the like adhering to the probe. However, as disclosed in Patent Literature 2, even if a plurality of vacuum tanks are provided, pressure in the tanks cannot be adjusted in response to a greatly different external environment such as atmospheric pressure.

An object of the invention is to provide an automatic analyzer that can be stably operated even in an area with different external environments such as altitude.

Solution to Problem

One of representative automatic analyzers of the invention is an automatic analyzer including: a vacuum pump; a vacuum tank connected to the vacuum pump; a vacuum bin connected to the vacuum tank; a unit that includes a plurality of suction nozzles configured to suction liquid from a plurality of reaction containers and that is connected to the vacuum bin; and a pressure adjustment mechanism provided between the vacuum pump and the vacuum tank and configured to adjust suction pressure of the suction nozzles. The pressure adjustment mechanism is provided between the vacuum pump and the vacuum tank, which makes it possible to adjust a pressure difference between external atmospheric pressure and tank pressure according to the installation environment.

Further, one of the other representative automatic analyzers of the invention is an automatic analyzer including: a vacuum pump; a vacuum tank connected to the vacuum pump, a vacuum bin connected to the vacuum tank; a unit that includes a plurality of suction nozzles configured to suction liquid from a plurality of reaction containers and that is connected to the vacuum bin, and a hole that is provided in the vacuum tank or the vacuum bin and that is in communication with outside. By providing the hole in communication with the outside in a vacuum tank or a vacuum bin, it possible to control the pressure difference between the pressure in the vacuum tank and the external atmospheric pressure where the analyzer is installed to be constant regardless of the installation environment.

Advantageous Effect

According to the invention, it is possible to provide an automatic analyzer that can be stably operated without being influenced by suction performance if the automatic analyzer is simply set even if being installed in an environment with different external atmospheric pressures.

Problems, configurations, and effects other than the above will become apparent from the description of embodiments below.

BRIEF DESCRIPTION OF DRAWINGS

FIG. 1 is a schematic view of an automatic analyzer to which the invention is applied.

FIG. 2 is a schematic view of a washing device and a vacuum suction device shown in FIG. 1.

FIG. 3 is a diagram showing characteristics of flow rate and outlet pressure of a vacuum pump when altitude changes.

FIG. 4 is a diagram showing pressure history in a vacuum tank when the altitude changes.

FIG. 5 is a schematic view of the washing device and the vacuum suction device according to a first embodiment.

FIG. 6 is a schematic view of a washing device and a vacuum suction device according to a third embodiment.

FIG. 7 is a diagram showing pressure history in a vacuum tank in a case where two vacuum pumps are installed in series when altitude changes.

FIG. 8 is a schematic view of a washing device and a vacuum suction device according to a fourth embodiment.

FIG. 10 is a schematic view of a washing device and a vacuum suction device according to a sixth embodiment.

FIG. 11 is a diagram showing an operation sequence of two electromagnetic valves according to the sixth embodiment.

FIG. 12 is a view showing pressure history in a vacuum tank according to the sixth embodiment.

FIG. 13 is a schematic view of a washing device and a vacuum suction device according to a seventh embodiment.

DESCRIPTION OF EMBODIMENTS

Figure 9A:
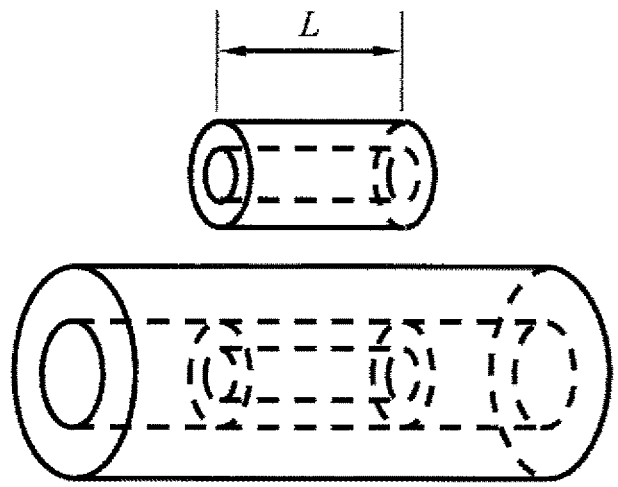
FIGS. 9A and 9B are schematic views of a fixed throttle according to the fourth embodiment.

First to seventh embodiments will be described below with reference to FIGS. 1 to 13.

First Quintessence

An embodiment of the invention will be described below with reference to the drawings.

FIG. 1 is a schematic view of a normal automatic analyzer to which the invention is applied.

In FIG. 1, reaction containers 2 are arranged circumferentially on a reaction disk 1. A plurality of reagent bottles 10 can be arranged circumferentially in a reagent disk 9. A detergent bottle 10a can also be arranged in the reagent disk 9. A sample transferring mechanism 17 which moves a rack 16 mounted with sample containers 15 is installed in the vicinity of the reaction disk 1.

Reagent dispensing mechanisms 7, 8 which are rotatable and vertically movable are installed between the reaction disk 1 and the reagent disk 9. The reagent dispensing mechanisms 7, 8 include reagent probes 7a, 8a, respectively. The reagent probe 7a or 8a is moved vertically and horizontally by the reagent dispensing mechanism 7 or 8. A reagent syringe 18 is connected to the reagent probe 7a or 8a. The reagent syringe 18 suctions and discharges a reagent by the reagent probe 7a or 8a. The reagent syringe 18 suctions and discharges washing water in the reagent probe 7a or 8a or washing water or detergent from the detergent bottle 10a to wash the inside of the reagent probe 7a.

A sample dispensing mechanism 11 which is rotatable and vertically movable is installed between the reaction disk 1 and the sample transferring mechanism 17. The sample dispensing mechanism 11 includes a sample probe 11a. A sample syringe 19 is connected to the sample probe 11a. The sample probe 11a moves vertically and horizontally while drawing a circular arc around a rotation axis to dispense a sample into the reaction containers 2 from the sample containers 15.

For analyzing the sample in the reaction containers 2, a washing mechanism 3, a spectrophotometer 4, mixing mechanisms 5, 6, the reagent disk 9, and the sample transferring mechanism 17 are arranged around the reaction disk 1. The spectrophotometer 4 receives light emitted from a light source (not shown).

Washing tanks 30, 31, 32, 33, and 34 are arranged on the operation range of the mixing mechanisms 5, 6, the reagent dispensing mechanisms 7, 8, and the sample dispensing mechanism 11, respectively. The washing tanks 30, 31 are for the mixing mechanisms 5, 6, the washing tanks 32, 33 are for the reagent probes 7a, 8a, and the washing tank 30 is for the sample probe 11a.

A vacuum suction device 50 for vacuum suction of analyzed reaction liquid remaining in the reaction containers 2 is connected to the washing mechanism 3.

FIG. 2 is a view schematically showing the washing mechanism 3, the vacuum suction device 50, the reagent probe 7a, and the washing tank 32. Suction nozzles 3a provided in the washing mechanism 3 are connected to a waste liquid bin 51a (vacuum bin), an electromagnetic valve 52a, a vacuum tank 53, and a vacuum pump 54 through tubes 55. The washing tank 32 is connected to a waste liquid bin 51b (vacuum bin), an electromagnetic valve 52b, the vacuum tank 53, and the vacuum pump 54 through the tubes 55. The vacuum tank 53 is always in a vacuum state by suction performed by the vacuum pump 54. The electromagnetic valve 52a opens at the timing of suctioning the analyzed reaction liquid, so that the vacuum tank 53 utilizes vacuum pressure to suction the analyzed reaction liquid from the reaction containers 2. Similarly, the electromagnetic valve 52b opens at the timing of suctioning the washing liquid adhering to the probe, so that the vacuum tank 53 utilizes the vacuum pressure to suction the adhered washing liquid from the reagent probe 7a. Meanwhile, the waste liquid bin 51a or 51b is a container for storing the suctioned analyzed reaction liquid or the suctioned washing liquid, which can be released through electromagnetic valves 56a and 56b, respectively. That is, the waste liquid bin 51a or 51b serves to prevent the analyzed reaction liquid or the washing liquid from entering the vacuum tank 53.

A sample to be inspected such as blood is contained in the sample containers 15 placed on the rack 16 carried by the sample transferring mechanism 17. Further, each mechanism is connected to a controller 21 and operation of each mechanism is controlled by the controller 21.

The sample to be inspected is dispensed from the sample containers 15 to the reaction containers 2 by the sample probe 11a. The reagent is dispensed from the reagent bottles 10 to the reaction containers 2 by the reagent probe 7a. In the reaction containers 2, the sample and the reagent are mixed by the mixing mechanisms 5, 6, and the mixed liquid is irradiated with light emitted from the light source, and the emitted light is received by the spectrophotometer 4. The controller 21 calculates the concentration of a predetermined component contained in the sample based on the amount of the received light. The sample is analyzed by such a method.

Hereinafter, the reason why the vacuum suction amount of the analyzed reaction liquid is reduced or the vacuum suction amount of the washing liquid or the like adhering to the probe is reduced when the analyzer is installed in an area with a high altitude will be described.

It is known that, in consideration of the theory of rotary machines, the performance of the rotary machines using gas as operation fluid, such as fans, compressors, vacuum pumps is reduced when being operated in the area with high altitude.

FIG. 3 is a diagram showing characteristics of flow rate and pressure of a vacuum pump when the altitude changes. As shown in the diagram, the outlet pressure of the vacuum pump at an altitude of 3000 m is lower than the outlet pressure of the vacuum pump at an altitude of 0 m even when the vacuum pump exhausts gas at a certain flow rate.

The reason why the performance of the vacuum pump is reduced when the altitude is high, that is, when the air pressure is lowered, can be described by using a performance conversion formula for a compression rotary machine. That is, if Reynolds numbers are not significantly different, the performance can be converted based on law of similarity. When a prescribed state is indicated by *, a pump inlet is indicated by 1, and a pump outlet is indicated by 2, a pressure ratio at prescribed conditions can be expressed as follows.

$$P^*_2/P^*_1 = P_2/P_1 \quad (1)$$

For example, in the case of the vacuum pump shown in the diagram, if $P^*_1$ is 101.32 kPa, $P^*_2$ is 21.33 kPa, and $P_1$ is 70.12 kPa (atmospheric pressure at an altitude of 3000 m), $P_2$ will be 14.8 kPa. For this reason, $P^*_1 - P^*_2 = 80.0$ kPa when the head of the vacuum pump is at an altitude of 0 m, $P_1 - P_2 = 55.3$ kPa when the head of the vacuum pump is at an altitude of 3000 m, and it is expected that the performance is reduced by about 30%.

The suction amount of the analyzed reaction liquid that can be suctioned by the suction nozzle 3a provided in the washing mechanism 3 is determined by the pressure difference between the pressure in the vacuum tank 53 and the inlet pressure of the suction nozzles 3a, that is, the external atmospheric pressure. That is, the flow rate is determined such that the pressure difference from the vacuum tank 53 to the suction nozzle 3a and the pressure resistance associated with the suction flow rate are balanced.

When the device is installed at a high altitude, the performance of the vacuum pump 54 is lowered, and the pressure difference between the pressure of the vacuum tank 53 and the inlet pressure of the suction nozzles 3a, that is, the external atmospheric pressure, is smaller than the pressure difference at the altitude of 0 m. As a result, since the suction flow rate by the suction nozzles 3a is reduced, the analyzed reaction liquid cannot be sufficiently suctioned.

Therefore, numerical simulation was conducted to examine the influence of the performance reduction of the vacuum pump 54 on the pressure of the vacuum tank 53 and the suction flow rate of the suction nozzles 3a.

Pressure, flow rate, and temperature in pipelines were evaluated using a pipeline network numerical simulation technique. In this analysis program, the pressure, the flow rate, and the temperature in the pipes can be analyzed by modeling each of the pipes, the pumps, the vacuum tank 53, and the vacuum bins as an one-dimensional flow path. The pipeline resistance can be determined from a pipe friction loss factor, the diameter and the length of the pipeline, which can be determined according to a widely known Moody diagram. The vacuum pump 54 was analyzed by modeling using characteristics of the flow rate and pressure of the pump which are obtained from a catalog or the like. By assuming that the tank capacity is a setting variable and an isothermal change is made in the vacuum tank 53, the pressure is determined according to the flow rates that flows in and flows out of the vacuum tank 53. The electromagnetic valve 52a performs modeling to enable and disable the pipeline according to the opening and closing timings, and then analysis is performed.

FIG. 4 shows the pressure history of the vacuum tank 53 obtained by the analysis. It can be known that, when the analyzer is installed in an environment with an altitude of 3000 m, the performance of the vacuum pump 54 is lowered and the degree of vacuum of the vacuum tank 53 is greatly reduced. Since the degree of vacuum in the vacuum tank 53 is reduced, the suction flow rate is reduced, and the stability of the device is impaired due to the decrease in the suction capacity.

Thus, as shown in FIG. 5, in the present embodiment, a control mechanism 60 for changing the performance of the vacuum pump 54 according to a change in an external environment such as altitude is mounted. As described above, the control mechanism 60 can change the rotation speed of the vacuum pump according to the change of the external atmospheric pressure, so that the performance of the vacuum pump can be changed according to the change of the external environment, and the decrease in the suction flow rate can be prevented. For example, the control mechanism 60 controls the vacuum pump so as to increase the rotation speed of the vacuum pump because the suction flow rate decreases in an area with high altitude. The control mechanism 60 may control the vacuum pump 54 as the same controller as the controller 21, or may be a controller different from the controller 21.

In addition, in the present embodiment, a pressure sensor 61 capable of measuring the pressure in the vacuum tank 53 is mounted. The pressure sensor 61 may measure, as a measured value, the difference between the pressure in the vacuum tank 53 and the external atmospheric pressure. The pressure of the vacuum tank 53 is adjusted by controlling the rotation speed of the vacuum pump so as to make the pressure value the same as the pressure value at an altitude of 0 m. A device having such a control mechanism 60 can have stable suction performance at all times.

In view of obtaining the stable suction performance at all times, it is desirable to mount the pressure sensor 61. This is because the control mechanism 60 can change the rotation speed of the vacuum pump 54 according to the pressure value (the pressure in the vacuum tank 53, the pressure difference between the pressure in the vacuum tank 53 and the external atmospheric pressure, or the like) measured by the pressure sensor 61 which is provided in the vacuum tank 53.

Second Embodiment

As another embodiment, it is sufficient to use the pressure sensor 61 in the vacuum tank 53 only at a setting time. After the adjustment, it is sufficient if the vacuum tank 53 is operated at a rotation speed at the setting time, and the vacuum pressure and the suction flow rate in the vacuum tank 53 are sufficient. Since it is sufficient to use the pressure sensor 61 only at the setting time, the pressure sensor may be removed after the setting time is passed. In any case, it will be fine if the control mechanism 60 can change the rotation speed of the vacuum pump 54 according to the pressure difference between the external atmospheric pressure and the pressure in the vacuum tank 53.

Besides providing the control mechanism 60 capable of changing the rotation speed of the vacuum pump and changing the rotation speed in a higher accuracy using a pressure sensor as in the first embodiment, an example may be considered in which the pressure value of the pressure sensor is used only at the setting time as in the second embodiment.

Thus, by changing the rotation speed of the vacuum pump, the pressure difference become identical even in an environment with different altitudes and the performance of the vacuum pump 54 can be improved. As a result, regardless of in which area an automatic analyzer equipped with this function is installed, the flow rate will always be substantially constant, analyzed reaction liquid can be reliably suctioned from a reaction container, and the analyzed reaction liquid is always collected in a waste bin and does not flow to the vacuum pump.

Third Embodiment

In addition, the degree of vacuum in the vacuum tank 53 may be increased by simply connecting a plurality of vacuum pumps 54 in series, instead of performing rotation speed control and pressure control. FIG. 6 shows an embodiment in which two vacuum pumps 54 are connected in series. Connecting the two vacuum pumps 54a, 54b in series significantly improves the performance of the vacuum pumps 54, so that the pressure in the vacuum tank 53 can be sufficiently reduced. A plurality of identical vacuum pumps 54 may be connected to each other depending on the environment, or a plurality of vacuum pumps 54 having different performances may be connected. The pump may be selected such that the suction performance of the pump and the pressure difference between the pressure in the vacuum tank 53 and the external atmospheric pressure become appropriate values according to the atmospheric pressure at which the analyzer is installed.

In a case where the automatic analyzer of the third embodiment is installed at a predetermined altitude or higher, it is conceivable to connect a plurality of vacuum pumps in series, but for the same type of automatic analyzer installed below the predetermined altitude, it may not be necessary to connect the plurality of vacuum pumps in series in order to ensure the performance of the analyzer. Therefore, in the automatic analyzer of the third embodiment, the number of vacuum pumps connected in series is larger than that of vacuum pumps in the automatic analyzer of the same type installed at least below the predetermined altitude.

As a result, by substantially changing only the number of the vacuum pumps, approximately the same performance of the automatic analyzer can be ensured regardless of the altitude difference even automatic for the automatic analyzer of the same type. Further, from the viewpoint of cost reduction by mass production, it is desirable to connect the vacuum pumps of the same specification in series.

Fourth Embodiment

In the third embodiment, when the vacuum pressure of the vacuum tank 53 is adjusted, it is difficult to select a pump, and when the degree of vacuum of the vacuum tank 53 is high, the suction flow rate may become higher than necessary. In this case, analyzed reaction liquid cannot be sufficiently captured in the waste liquid bin 51a (vacuum bin) and flows into the vacuum tank, and the analyzed reaction liquid may be stored in the vacuum tank. FIG. 7 shows the pressure history in the vacuum tank when two identical vacuum pumps 54a, 54b are connected in series. It can be known that the pressure in the vacuum tank 53 is too low because the capacity of the vacuum pump 54 is too high. In such a case, as shown in FIG. 8, a pressure adjustment mechanism 62 may be newly installed between the vacuum tank 53 and the vacuum pump 54. The suction pressure of a suction nozzle can be adjusted by the pressure adjustment mechanism 62.

In the present embodiment, a fixed throttle is mounted as the pressure adjustment mechanism 62. A new throttle may be placed in a tube already installed in order to connect the vacuum tank 53 to the vacuum pump 54. Alternatively, tubes thinner than the existing tube may be connected in series.

Figure 9B:
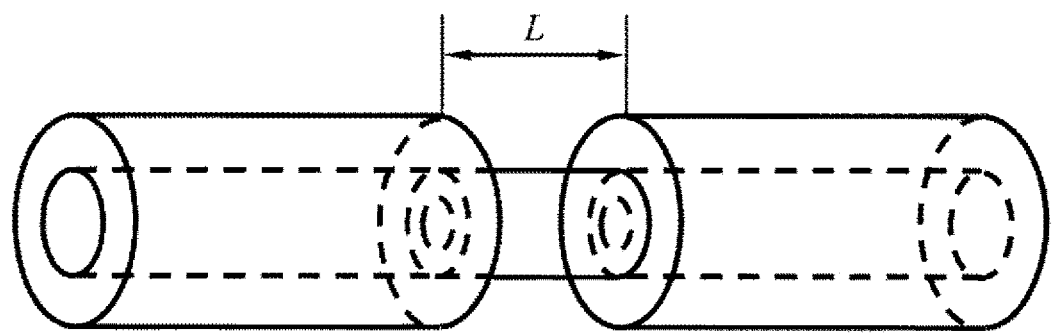

FIG. 9 shows an example of the fixed throttle. In FIG. 9(a), a member having a small pipeline diameter is inserted into the existing tube. In the case of such a member, there is a possibility that the pipeline resistance cannot be sufficiently ensured. In this case, as shown in FIG. 9(b), a thin tube may be connected between the existing tubes. In both cases, a fixed throttle is provided in the tube, and the tube length and the tube diameter are changed, so that a desired pressure resistance can be obtained, and the pressure of the vacuum tank 53 can be easily adjusted.

As the pressure adjustment mechanism 62, the fixed throttle shown in the present embodiment adjusts the pressure by narrowing the diameter of the pipeline. If the area where the analyzer is installed can be recognized in advance, since the altitude can be known, the diameter and the length of the throttle may be determined in advance, and then the throttle is mounted on the analyzer. Alternatively, the diameter and length of the throttle to be mounted may be determined by measuring the atmospheric pressure and the pressure in the vacuum tank when the analyzer is installed.

Since a tube having the same diameter is used in a normal automatic analyzer, when the pressure adjustment mechanism 62 is provided, the tube has a first section and a second section which have different cross-sectional areas. By providing the fixed throttle, the cross section of the second section is smaller than that of the first section.

Although only one vacuum pump 54 is shown in FIG. 8, a plurality of vacuum pumps 54 connected in series may be included, or only one vacuum pump 54 which is a high-performance vacuum pump and can produce a higher degree of vacuum may be included.

Fifth Embodiment

Further, the pressure adjustment mechanism 62 may be a variable throttle. That is, as long as the variable throttle is an adjustable valve, the diameter of the throttle can be adjusted in any area with different altitudes, and the diameter of the throttle can be adjusted without taking much time.

Sixth Embodiment

The present embodiment is characterized in that an electromagnetic valve 57 is provided as the newly added pressure adjustment mechanism 62 in a flow path connecting the vacuum tank 53 to the vacuum pump 54. FIG. 10 is a diagram for explaining the configuration of the present embodiment. That is, the pressure in the vacuum tank 53 can be adjusted by adjusting opening and closing time of the electromagnetic valve 57.

In order to examine the control effect of the electromagnetic valve 57, evaluation was performed using a pipeline network numerical simulation technique that can analyze the pressure, the flow rate, and the temperature in a pipeline. In order to simplify the description, an analysis was performed for a flow path for suctioning analyzed reaction liquid from the reaction containers 2. That is, the flow path is at the side of the waste liquid bin 51a (vacuum bin) and the electromagnetic valve 52*a*. Each pipeline was modeled as a one-dimensional pipeline, and then the analysis is performed.

FIG. 11 shows opening and closing operations of the electromagnetic valve 52*a*. Further, FIG. 11 also shows opening and closing operations of the electromagnetic valve 57 newly added in the present embodiment. The opening and closing operations of the electromagnetic valve 57 are controlled by the controller 21. Since the suction nozzle 3*a* suctions reaction liquid when the electromagnetic valve 52*a* is open, the suction pressure of the suction nozzle can be adjusted by closing the electromagnetic valve 57 from an open state at this time. More preferably, not only is the operation of closing the electromagnetic valve 52*a* while the electromagnetic valve 52*a* is open performed once, but, as shown in the drawing, it is possible to perform the adjustment with higher accuracy by performing the opening and closing operations in small intervals.

FIG. 12 shows an analysis result when the pressure of the vacuum tank 53 is in a quasi-stationary state and is in a stable state. The horizontal axis represents time, and the vertical axis represents the pressure in the tank. A broken line indicates a pressure history in the vacuum tank 53 when one vacuum pump 54 is used at an altitude of 0 m. Meanwhile, a dashed-dotted line indicates a pressure history when two vacuum pumps 54 are connected in series at an altitude of 3000 m. Further, a solid line indicates a pressure history when two vacuum pumps 54 are connected in series at an altitude of 3000 m, the electromagnetic valve 57 is newly added as a pressure adjustment mechanism and the control as shown in FIG. 11 is added.

It can be known that by controlling the electromagnetic valve 57, the average pressure of the vacuum tank 53 is substantially the same value as that of the vacuum tank 53 at the altitude of 0 m. From this, it is expected that the suction amount from the suction nozzle 3*a* does not change at the altitude of 0 m and the altitude of 3000 m. Also, there are two times in a cycle that a main maximum value of pressure is equivalent to that at the altitude of 0 m, but there is only one time for the pressure waveform controlled by the electromagnetic valve 57, and the pressure in the vacuum tank can be controlled. By controlling the opening and closing of the electromagnetic valve 57 with respect to the electromagnetic valve 52 in this manner, the pressure history in the vacuum tank can be largely changed, and even if the altitude changes and the performance of the vacuum pump 54 is largely changed, stable suction performance can also be easily achieved.

Although only one vacuum pump 54 is shown in FIG. 10, a plurality of vacuum pumps 54 connected in series may be included, or only one vacuum pump 54 which is a high-performance vacuum pump and can produce a higher degree of vacuum may be included.

Further, when the automatic analyzers according to the fourth to sixth embodiments are installed at a predetermined altitude or higher, it is desirable that the vacuum pump is capable of obtaining a higher degree of vacuum than an automatic analyzer of the same type installed below the predetermined altitude. When a plurality of vacuum pumps are connected in series, it is desirable that the number of the vacuum pumps is larger than that of the vacuum pumps in the automatic analyzer of the same type installed below the predetermined altitude. As a result, by substantially changing only the number of the vacuum pumps, approximately the same performance of the automatic analyzer can be ensured even if the automatic analyzer is installed in different altitudes. Further, from the viewpoint of cost reduction by mass production, it is desirable to connect the vacuum pumps of the same specification in series.

Seventh Embodiment

In the present embodiment, a pressure adjustment mechanism is provided in the vacuum tank 53 or the vacuum bin 51. In order to adjust the pressure difference between the pressure in the vacuum tank and the external atmospheric pressure, an open tube 70 may be provided in the vacuum tank 53 or the vacuum bin 51. FIG. 13 shows a configuration of the present embodiment.

In the present embodiment, by installing a vacuum pump capable of achieving a sufficient vacuum pressure in the vacuum tank when the automatic analyzer is installed at an altitude of 3000 m and installing the open tube 70 when the automatic analyzer is installed at an altitude of 0 m, an appropriate pressure value can be obtained without lowering the pressure in the vacuum tank more than necessary.

Since the vacuum tank 53 or the vacuum bin 51 is provided with a hole in communication with the outside and air can be guided from the outside, it is possible to set an appropriate pressure value without decreasing the pressure in the vacuum tank more than necessary. The suction pressure of a suction nozzle can be adjusted by this hole. The open tube 70 is connected to the hole, and the air from the outside flows into the vacuum tank 53 or the vacuum bin 51 through the open tube 70 and the hole in communication with the outside in this order.

The hole or the open tube 70 may be provided in either one or both of the vacuum tank 53 and the vacuum bin. In addition, since the inflow amount of air from the outside can be adjusted by changing the diameter of the hole or the open tube 70, the suction pressure of the suction nozzle can also be adjusted. Since the diameter of the open tube 70 connected to the hole can be changed easier than changing the diameter of the hole, it is desirable to provide an open tube from the viewpoint of ease of adjustment.

That is, by substantially changing the presence or absence of the hole, the presence or absence of the open tube 70, or the diameter of the open tube according to the altitude at which the automatic analyzer is installed, approximately the same performance of the automatic analyzer of the same type can be secured without changing the pump and flow path configuration even if the automatic analyzer is installed in different altitudes. Furthermore, from the viewpoint of cost reduction by mass production, it is desirable to use vacuum pumps and vacuum flow path networks of the same specification. If the inner diameter of the open tube 70 is larger than φ2.0, there may be a problem that the pressure in the vacuum tank cannot be sufficiently reduced due to the air constantly flowing into through the open tube 70 with respect to the suction pressure of the vacuum pump. Therefore, the inner diameter of the open tube 70 is preferably φ2.0 or less.

From a viewpoint of common design of the vacuum tank and the vacuum bin, a hole is provided in advance, the suction pressure of the suction nozzle may be adjusted by suppressing the inflow of air by closing the hole with a closed tube and changing the length of the open tube.

Further, the hole may be an open throttle capable of varying the diameter of the hole. By providing the vacuum tank 53 or the vacuum bin 51 with the open throttle, it is possible to control the pressure difference between the pressure in the vacuum tank 53 and the external atmospheric pressure in which the analyzer is installed to be constant regardless of installation environment.

The first to seventh embodiments have been described above.

Various modifications may be made without departing from the spirit of the invention. Basically, any type of pressure adjustment mechanism may be used as long as the device is capable of adjusting the pressure. That is, regardless of what kind of performance is provided for the pump, it is sufficient if a pressure adjustment mechanism capable of adjusting the pressure difference between the pressure in the vacuum tank and the external atmospheric pressure to a prescribed value can be installed between the vacuum tank and the vacuum pump. Alternatively, as the pressure adjustment mechanism, a hole in communication with the outside may be provided in the vacuum tank or the vacuum bin to adjust the pressure difference between the pressure in the vacuum tank and the external atmospheric pressure to the prescribed value.

In first to seventh embodiments, an example is shown in which vacuum suction is performed by a common vacuum tank in a unit having a plurality of suction nozzles for suctioning liquid from a plurality of reaction containers and the washing tank for suctioning the washing liquid adhering to the probes. However, it is not necessary to use the vacuum tank common to the washing tank. However, the number of vacuum tanks and the number of vacuum pumps can be reduced by using the vacuum tank common to the washing tank. Although both referred to as a washing tank, a washing tank for applying washing liquid to the probes and performing washing may be configured separately from a washing tank for suctioning the washing liquid. In the present description, even a washing tank used for suctioning the washing liquid and not involving washing can be considered as a washing tank in claims.

In the first and second embodiments, in addition to automatically determining the rotation speed, the control mechanism 60 may manually set the rotation speed and control the vacuum pump to be in the set rotation speed. In either case, the control mechanism 60 can change the rotation speed. However, since the rotation speed of the vacuum pump gradually increases until a stable state is reached, "can change the rotation speed" described in the present description does not mean a temporary change in the rotation speed but means the change of the rotation speed in the stable state.

In addition, the vacuum pump of the same specification as described in the present description means a vacuum pump of the same model number from the viewpoint of cost reduction.

Further, the vacuum bin as described in the present description is a buffer container connected between the suction nozzle and the vacuum tank regardless of the material. For example, the vacuum bin is a container having a volume smaller than the vacuum tank.

REFERENCE SIGN LIST

1 reaction disk, 2 reaction container, 3 washing mechanism, 3a suction nozzle, 4 spectrophotometer, 5, 6 mixing mechanism, 7, 8 reagent dispensing mechanism, 7a, 8a reagent probe, 9 reagent disk, 10 reagent bottle, 10a detergent bottle, 11 sample dispensing mechanism, 11a sample probe, 15 sample container, 16 rack, 17 sample transferring mechanism, reagent syringe, 19 sample syringe, 21 controller, 30, 31 washing tank for mixing mechanism, 32, 33 wash tank for reagent probe, 34 wash tank for sample probe, 50 vacuum suction device, waste liquid bin (vacuum bin), 52 electromagnetic valve, vacuum tank, 54 vacuum pump, 55 tube, 57 electromagnetic valve, 60 control mechanism, 61 pressure sensor, 62 pressure adjustment mechanism, 70 open tube

The invention claimed is:

1. An automatic analyzer comprising:
   a vacuum pump;
   a vacuum tank connected to the vacuum pump;
   a vacuum bin connected to the vacuum tank;
   a unit that includes a plurality of suction nozzles configured to suction liquid from a plurality of reaction containers and that is connected to the vacuum bin; and
   a controller configured to change a rotation speed of the vacuum pump; and
   a pressure sensor, provided in the vacuum tank, that measures a vacuum tank pressure, wherein
   the controller is configured to determine a result of comparing an inlet pressure of the plurality of suction nozzles to the vacuum tank pressure and change the rotation speed of the vacuum pump based on the result.

2. The automatic analyzer according to claim 1, wherein the controller changes the rotation speed according to a pressure difference between the external atmospheric pressure and the pressure in the vacuum tank.

3. The automatic analyzer according to claim 2, wherein the controller changes the rotation speed based on a pressure value measured by the pressure sensor.

4. The automatic analyzer according to claim 1, further comprising:
   a washing tank connected to the vacuum tank and configured to suction washing liquid adhering to a probe by vacuum pressure of the vacuum tank.

5. An automatic analyzer comprising:
   a vacuum pump;
   a vacuum tank connected to the vacuum pump;
   a vacuum bin connected to the vacuum tank;
   a unit that includes a plurality of suction nozzles that suction liquid from a plurality of reaction containers and that is connected to the vacuum bin; and
   a hole that is provided in the vacuum tank or the vacuum bin and that is in direct communication with an external environment that is external to the vacuum tank and the vacuum bin; and
   an open tube connected directly to the hole at a first end of the open tube, wherein a second end of the open tube, opposite from the first end, is open to the external environment;
   wherein the hole is in direct communication with the external environment via only the open tube.

6. The automatic analyzer of claim 5, wherein the automatic analyzer adjusts the suction pressure of the suction nozzles based on air that passes through the hole from the external environment.

* * * * *